United States Patent
Kawase et al.

(10) Patent No.: US 12,296,842 B2
(45) Date of Patent: May 13, 2025

(54) OPERATION MANAGEMENT SYSTEM

(71) Applicant: TOYOTA BOSHOKU KABUSHIKI KAISHA, Aichi (JP)

(72) Inventors: Osamu Kawase, Aichi (JP); Komei Yano, Aichi (JP); Yuki Kamiya, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 82 days.

(21) Appl. No.: 18/142,648

(22) Filed: May 3, 2023

(65) Prior Publication Data

US 2023/0382412 A1 Nov. 30, 2023

(30) Foreign Application Priority Data

May 24, 2022 (JP) ................. 2022-084770

(51) Int. Cl.
*B60W 50/14* (2020.01)
*B60W 40/08* (2012.01)
(Continued)

(52) U.S. Cl.
CPC ............ *B60W 50/14* (2013.01); *B60W 40/08* (2013.01); *G06V 20/597* (2022.01); (Continued)

(58) Field of Classification Search
CPC ................. B60W 50/14; B60W 40/08; B60W 2040/0827; B60W 2050/143; B60W 2050/146; B60W 2420/403; B60W 2540/221; B60W 2540/229; B60W 2556/45; B60W 2556/65; B60W 40/00;
(Continued)

(56) References Cited

U.S. PATENT DOCUMENTS

2016/0001781 A1 * 1/2016 Fung .................... G07C 9/37
  701/36
2016/0159217 A1 * 6/2016 Kim ..................... B60K 28/066
  340/575

FOREIGN PATENT DOCUMENTS

DE  102007030526 A1 * 1/2009 ........... G06Q 10/047
JP  2012-150606         8/2012
(Continued)

*Primary Examiner* — Rufus C Point
(74) *Attorney, Agent, or Firm* — Greenblum & Bernstein, P.L.C.

(57) ABSTRACT

Provided is an operation management system capable of timely giving a driver an opportunity to take a rest. One aspect of the present disclosure is an operation management system including a sensor acquiring biological information of a driver of each of management-target vehicles, and a server managing traveling plans, each including a destination and an arrival time, of the management-target vehicles. The server includes a processor performing an adjustment process for the traveling plans. In the adjustment process, the processor proposes, to a driver of an adjustment-target vehicle, a rest point extracted from rest facilities located on a traveling route in a traveling plan, based on the traveling plan of the adjustment-target vehicle, on the traveling plans of the management-target vehicles other than the adjustment-target vehicle, on biological information of the driver of the adjustment-target vehicle acquired by the sensor, and on crowdedness information of the rest facilities.

6 Claims, 5 Drawing Sheets

(51) Int. Cl.
*G06V 20/59* (2022.01)
*G06V 40/16* (2022.01)

(52) U.S. Cl.
CPC ... *G06V 40/174* (2022.01); *B60W 2040/0827* (2013.01); *B60W 2050/143* (2013.01); *B60W 2050/146* (2013.01); *B60W 2420/403* (2013.01); *B60W 2540/221* (2020.02); *B60W 2540/229* (2020.02); *B60W 2556/45* (2020.02)

(58) Field of Classification Search
CPC . B60W 2040/0872; B60W 2040/0881; B60W 2420/00; G06V 20/597; G06V 40/174; H04L 67/12; H04L 67/52; H04L 67/55
See application file for complete search history.

(56) References Cited

FOREIGN PATENT DOCUMENTS

| | | | | |
|---|---|---|---|---|
| JP | 2014-13496 | | 1/2014 | |
| JP | 6864320 | B2 * | 4/2021 | |
| JP | 2022012353 | A * | 1/2022 | ............ B60W 40/04 |

* cited by examiner

| VEHICLE ID | STARTING POINT | DESTINATION | ARRIVAL TIME | CURRENT LOCATION | REST POINT |
|---|---|---|---|---|---|
| 1 | LATITUDE x1, LONGITUDE y1 | LATITUDE a1, LONGITUDE b1 | 4.15 18:00 | LATITUDE s1, LONGITUDE t1 | FACILITY A |
| 2 | LATITUDE x2, LONGITUDE y2 | LATITUDE a2, LONGITUDE b2 | 4.16 08:00 | LATITUDE s2, LONGITUDE t2 | FACILITY B |
| 3 | LATITUDE x3, LONGITUDE y3 | LATITUDE a3, LONGITUDE b3 | 4.15 15:00 | LATITUDE s3, LONGITUDE t3 | FACILITY A |
| 4 | LATITUDE x4, LONGITUDE y4 | LATITUDE a4, LONGITUDE b4 | 4.16 12:00 | LATITUDE s4, LONGITUDE t4 | FACILITY C |
| ⋮ | ⋮ | ⋮ | ⋮ | ⋮ | ⋮ |

FIG. 3

OPERATION MANAGEMENT SYSTEM

CROSS-REFERENCE TO RELATED APPLICATIONS

This application claims the benefit of Japanese Patent Application No. 2022-084770 filed on May 24, 2022 with the Japan Patent Office, the entire disclosure of which is incorporated herein by reference.

BACKGROUND

The present disclosure relates to an operation management system.

There is known a driving support device that determines the degree of fatigue and the degree of drowsiness of a driver of an automobile and prompts the driver to take a rest (see Japanese Unexamined Patent Application Publication No. 2014-13496).

SUMMARY

With the above-described driving support device, the driver cannot take a rest when there is no parking space available in a planned rest facility (e.g., a service area or a parking area). Thus, the driver may fail to take a rest timely.

It is desirable that one aspect of the present disclosure provide an operation management system capable of timely giving a driver an opportunity to take a rest.

One aspect of the present disclosure is an operation management system including a sensor arranged in each of two or more management-target vehicles and configured to acquire biological information of a driver of each of the two or more management-target vehicles, and a server configured to manage traveling plans, each including at least a destination and an arrival time, of the two or more management-target vehicles.

The server includes a processor configured to perform an adjustment process for the traveling plans of the two or more management-target vehicles. The processor is configured, in the adjustment process, to propose, to a driver of an adjustment-target vehicle, which is one of the two or more management-target vehicles, a rest point extracted from two or more rest facilities located on a traveling route in a traveling plan, based on the traveling plan of the adjustment-target vehicle, on the traveling plans of the two or more management-target vehicles other than the adjustment-target vehicle, on biological information of the driver of the adjustment-target vehicle acquired by the sensor, and on crowdedness information of the two or more rest facilities.

According to such a configuration, traveling states of other vehicles and the crowdedness information of the rest facilities are taken into consideration in addition to the driver's state, whereby an available rest facility is proposed to the driver as the rest point. This makes it possible to timely give the driver an opportunity to take a rest.

In one aspect of the present disclosure, the two or more rest facilities may be rest facilities provided along an expressway. Such a configuration makes it possible to present a more reliable rest point because, for example, more accurate degree of congestion in the rest facilities can be obtained from the company managing the expressway.

In one aspect of the present disclosure, the processor may be configured to propose the rest point based on a degree of fatigue and a degree of drowsiness of the driver estimated from the biological information. Such a configuration makes it possible to present a proper timing for taking a rest in accordance with the driver's state.

In one aspect of the present disclosure, the sensor may include a camera configured to shoot facial expression of the driver, and a heart rate meter installed in a seat on which the driver is seated. Such a configuration makes it possible to increase the determination accuracy of the degree of fatigue and the degree of drowsiness of the driver without disturbing the driver's driving operation.

BRIEF DESCRIPTION OF THE DRAWINGS

Example embodiments to which the present disclosure is applied will be described below with reference to the accompanying drawings, in which:

FIG. 3 shows one example of traveling plans managed by a server in the operation management system in FIG. 1;

DETAILED DESCRIPTION OF EXEMPLARY EMBODIMENTS

1. First Embodiment

1-1. Configuration

Figure 1:
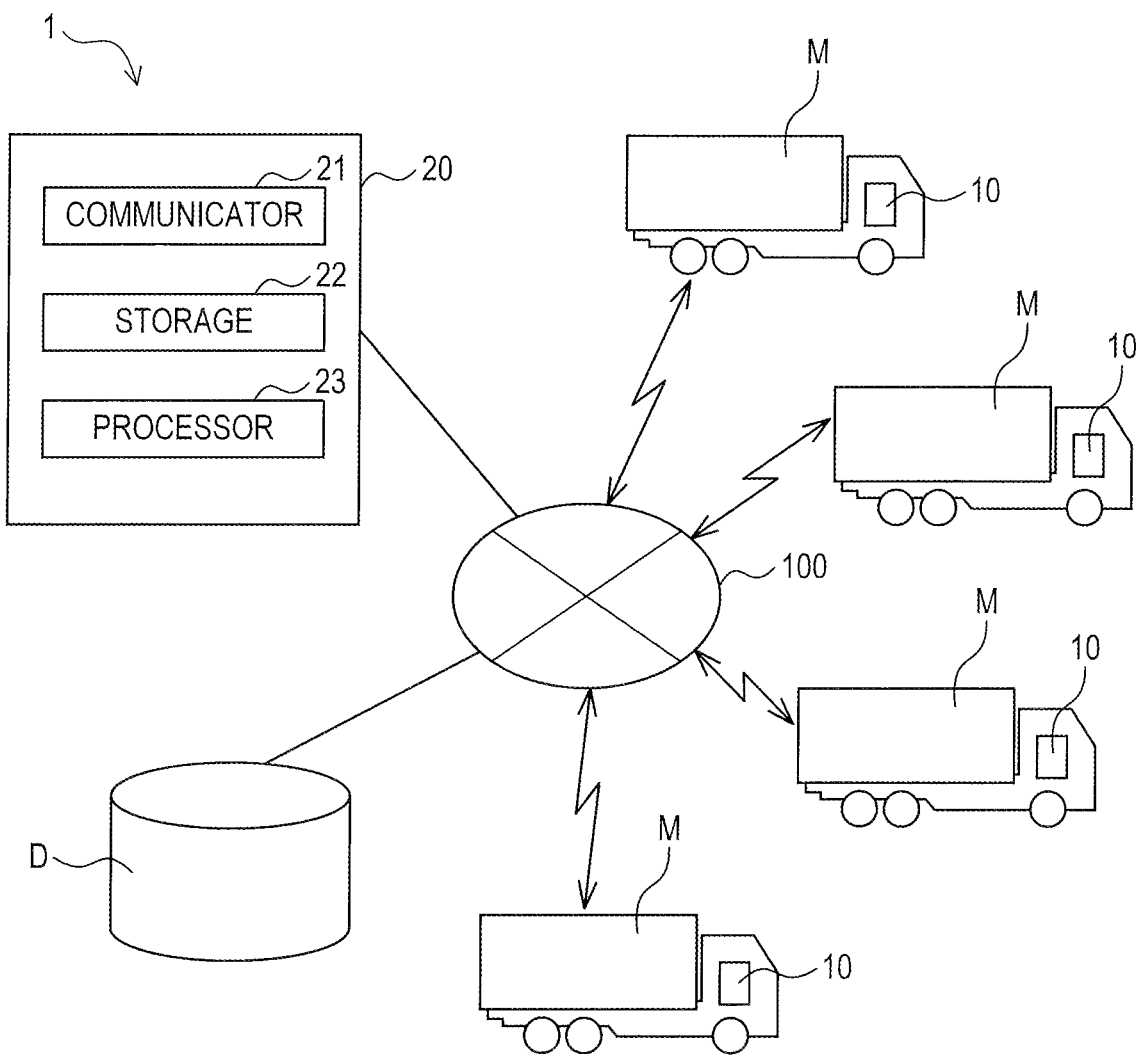
FIG. 1 is a schematic configuration diagram showing an operation management system in an embodiment.

An operation management system 1 shown in FIG. 1 is a system for optimizing operation of two or more management-target vehicles M.

The management-target vehicles M in the operation management system 1 are not limited to particular vehicles as long as they are driven by drivers. However, the operation management system 1 can provide particularly preferred traveling plans for business-purpose vehicles (e.g., a motor-truck, a bus, a taxi, and so on), which are legally required to have the drivers take a rest at regular intervals of time.

The operation management system 1 comprises a terminal unit 10 installed in each of the management-target vehicles M, and a server 20. The number of the management-target vehicles M managed by the operation management system 1 is not limited in particular. The management-target vehicles M may include different types of vehicles and/or vehicles operated by different operators (i.e., owned by different owners).

<Terminal Unit>

Figure 2:
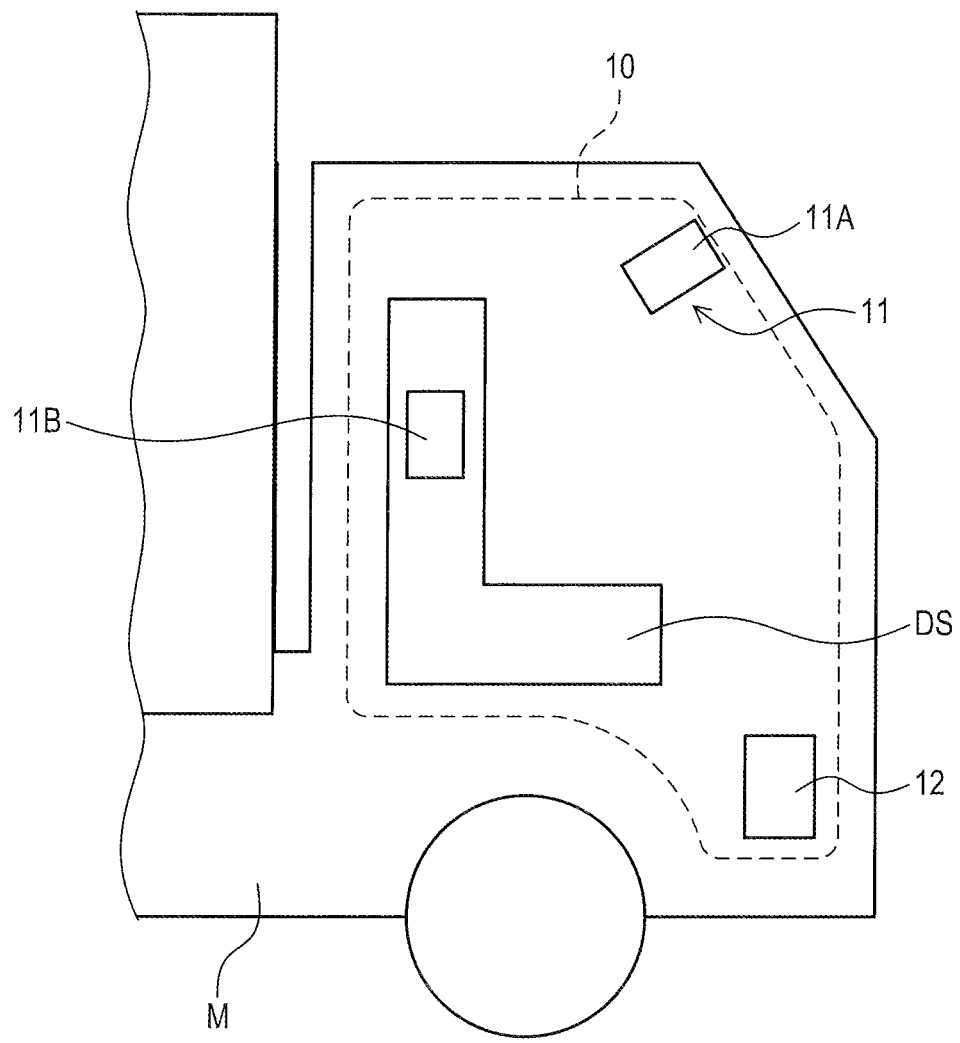
FIG. 2 is a schematic diagram showing a terminal unit in the operation management system in FIG. 1.

As shown in FIG. 2, the terminal unit 10 is installed in the management-target vehicle M. The terminal unit 10 comprises a sensor 11 and a communication device 12.

The sensor 11 is configured to acquire biological information of the driver of the management-target vehicle M in which the sensor 11 is installed. The sensor 11 comprises a camera 11A and a heart rate meter 11B. The camera 11A is configured to shoot facial expression of the driver who is driving.

The heart rate meter 11B is configured to acquire a heart rate of the driver who is driving. The heart rate meter 11B is installed in a seat DS on which the driver is seated. The heart rate meter 11B is a contactless measuring instrument not coming in direct contact with the driver's body.

In addition to the camera 11A and the heart rate meter 11B, the sensor 11 may comprise a thermometer to measure the driver's body temperature, a contact sensor to estimate the driver's posture, and so on. The contact sensor is configured with, for example, a pressure sensor and/or an acceleration sensor arranged in the seat DS.

The communication device 12 transmits, to the server 20, the biological information acquired by the sensor 11 (i.e., the facial expression and the heart rate of the driver) and a current location of the management-target vehicle M in which the communication device 12 is installed. The current location of the management-target vehicle M is acquired through, for example, a global positioning system (GPS) installed in the management-target vehicle M.

The communication device 12 receives, from the server 20, management information including rest point information. The communication device 12 performs wireless communication with the server via a network 100 such as the Internet, for example.

<Server>

The server 20 shown in FIG. 1 is configured to manage respective traveling plans, each including at least a destination and an arrival time, of the management-target vehicles M.

The server 20 is, for example, a computer (i.e., an information processor) including a processor, a storage medium such as a RAM or a ROM, an inputter/outputter, and a network communicator. The server 20 comprises a communicator 21, a storage 22, and a processor 23. The server may be configured with a single computer, or may be configured with two or more computers separately arranged at two or more sites.

[Communicator]

The communicator 21 is configured to perform transmission and reception of data to/from the respective terminal units 10 of the management-target vehicles M and to/from a database D on which road information is recorded.

Specifically, the communicator 21 receives the biological information acquired by the sensor 11 and the current location of the management-target vehicle M from the corresponding terminal unit 10 via the network 100. Moreover, the communicator 21 transmits the management information generated by the processor 23 to the corresponding terminal unit 10 via the network 100.

Furthermore, the communicator 21 receives the road information included in the database D external to the server 20 via the network 100. The database D is a cloud database accessible via the network 100.

The road information received by the communicator 21 includes at least the degree of congestion on the road and the degree of congestion in the rest facility along the road. The "rest facility" refers to a facility where the driver can park the vehicle to take a rest. The "degree of congestion of the rest facility" includes at least the number of vacant parking spaces (i.e., the number of vehicles that can be parked at the time).

Examples available as the database D may include a database provided by Vehicle Information and Communication System (VICS (registered trademark)), a database administered by a road administrator, and a database owned by a big data administrator, such as a platform provider. The communicator 21 may collect the road information from the two or more databases D.

[Storage]

The storage 22 stores registration information and the traveling plans of the management-target vehicles M. As seen in the table shown in FIG. 3, each traveling plan includes, for example, a vehicle ID (i.e., identification number), a starting point, a destination, an arrival time, a current location, and a rest point.

The starting point, the destination, and the arrival time in the traveling plan are input by, for example, an operator of each management-target vehicle M. In the example of FIG. 3, for the management-target vehicle M with the "vehicle ID" of "1", the traveling plan is registered in which the vehicle travels from the starting point of "latitude x1, longitude y1" to the destination of "latitude a1, longitude b1" by the arrival time of 18:00 on April 15. Although each point is represented by the latitude and the longitude in FIG. 3, such a point may be represented by the place name, the facility name, or the like.

In response to the information on the current location of each management-target vehicle M received by the communicator 21, in the storage 22, the current location included in the traveling plan is successively updated. Further, the storage 22 stores the rest point for each management-target vehicle M set by the processor 23. When the rest point for the management-target vehicle M is changed by the processor 23, the rest point included in the traveling plan stored in the storage 22 is also updated.

[Processor]

The processor 23 is configured to perform an adjustment process for the traveling plans of the management-target vehicles M.

In the adjustment process, the processor 23 proposes, to a driver of an adjustment-target vehicle, which is one of the management-target vehicles M, a rest point extracted from two or more rest facilities located on a traveling route in a traveling plan, based on the traveling plan of the adjustment-target vehicle, on the traveling plans of the management-target vehicles M other than the adjustment-target vehicle, on biological information of the driver of the adjustment-target vehicle acquired by the sensor 11, and on crowdedness information of the two or more rest facilities.

The traveling plans are acquired from the storage 22. The biological information of the driver is acquired from the communicator 21. The crowdedness information of the rest facilities is included in the road information in the database D received by the communicator 21.

The "adjustment-target vehicle" refers to a vehicle to be subjected to the adjustment process by the processor 23. Specifically, the processor 23 extracts one adjustment-target vehicle from the management-target vehicles M, and performs the adjustment process on this adjustment-target vehicle. Subsequently, the processor 23 extracts another management-target vehicle M not yet subjected to the adjustment process as the adjustment-target vehicle to perform the adjustment process repeatedly. By such repetition of the adjustment process, the processor 23 adjusts the traveling plans of the management-target vehicles M that require the adjustment process.

After completion of the adjustment process on the management-target vehicles M that require the adjustment process, the processor 23 performs the adjustment process again on the management-target vehicles M sequentially, at regular intervals.

Figure 4:
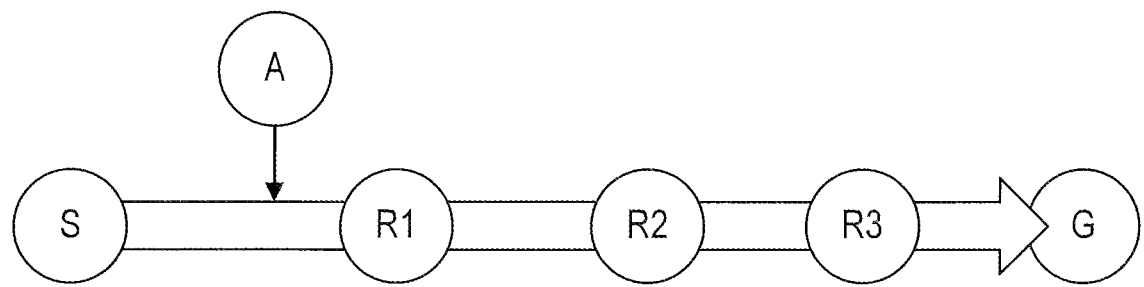
FIG. 4 is a conceptual diagram of a traveling route in the traveling plans in FIG. 3.

In the adjustment process, as shown in FIG. 4, the processor 23 detects rest facilities located on the traveling route of the adjustment-target vehicle (i.e., located between a starting point S and a destination G) based on the traveling plan of the adjustment-target vehicle. In the example of FIG. 4, there exist three rest facilities R1, R2, and R3 in the order closer to the current location A. The traveling route may be included in the traveling plan in advance, or may be set according to a route search by the processor 23 based on the starting point and the destination.

The processor 23 determines a parking certainty (i.e., a possibility that the vehicle can be parked) in each rest facility based on the crowdedness information of the three rest facilities R1, R2, and R3 and on the rest point information of other management-target vehicles M. The rest point information refers to information indicating whether any of the rest facilities R1, R2, and R3 has been set as a rest point for any of other management-target vehicles M.

Moreover, the processor 23 determines a preferred timing for taking a rest based on the biological information of the driver and on the departure time or the previous rest time. Specifically, in a case where fatigue of the driver is estimated to be severe based on the biological information, the processor 23 gives higher priority to use of a rest facility closer to the current location A. In determining such use priority, the processor 23 may utilize the degree of road congestion (i.e., congestion information).

Eventually, the processor 23 proposes, as the rest point, a rest facility considered to be most suitable for the driver, based on the parking certainty in each rest facility and the use priority. The processor 23 may propose two or more rest points in a prioritized manner.

For example, in a case where fatigue of the driver is relatively mild and where the parking certainty in the second rest facility R2 is higher than the parking certainty in the first rest facility R1, the processor 23 proposes the second rest facility R2 as the rest point. In this case, the first rest facility R1 may be proposed as a second candidate for the rest point.

In contrast, in a case where fatigue of the driver is relatively severe, even when the parking certainty in the second rest facility R2 is higher than the parking certainty in the first rest facility R1, the processor 23 proposes the first rest facility R1, which is closer to the current location A, as a first candidate for the rest point.

For the rest facilities on the traveling route, rest facilities provided along an expressway (i.e., service areas or parking areas) are suitable. In the case of the expressway, it is possible to present a more reliable rest point because, for example, more accurate degree of congestion in the rest facilities can be obtained from the company managing the expressway.

In determining the rest point, the processor 23 may utilize the biological information of the driver transmitted from the sensor 11 as is. However, the processor 23 may estimate the degree of fatigue and the degree of drowsiness of the driver from the biological information and use such parameters for proposing the rest point. In other words, the processor 23 may be configured to propose the rest point based on the degree of fatigue and the degree of drowsiness of the driver estimated from the biological information.

This makes it possible to present a proper timing for taking a rest in accordance with the driver's state. The degree of fatigue and the degree of drowsiness of the driver are determined using, for example, a determination formula describing relationships between the driver's facial expression and heart rate and the degree of fatigue and the degree of drowsiness of the driver. Examples of the facial expression of the driver used for the determination may include the size, the shape, and/or the position of the facial parts, such as eyes and a mouth, of the driver.

Instead of the determination formula, an artificial intelligence system built through a statistical method, such as machine learning, may be used. Further, the degree of fatigue and the degree of drowsiness may be estimated at the terminal unit 10 and then transmitted to the server 20.

In addition to the rest point, the processor 23 may propose a rest period to the driver. The processor 23 adjusts the length of the rest period based on the degree of fatigue and the degree of drowsiness of the driver. Specifically, as the degree of fatigue of the driver is higher, the processor 23 sets a rest period to be proposed longer.

The rest point proposed by the processor 23 is transmitted to the corresponding management-target vehicle M by the communicator 21 as the management information. In the management-target vehicle M, the driver is notified of the rest point by a sound or an image via an output device, such as a speaker or a display included in the terminal unit 10, or via a communication terminal, such as a car navigation system arranged in the vehicle or a smartphone.

The server 20 may be configured to transmit the traveling plans of the management-target vehicles M, including the rest points, to an administrator of the rest facility. This enables the administrator to forecast demand for parking spaces. Accordingly, the administrator can, for example, appropriately adjust the ratio of spaces for spending a night in a vehicle to spaces for taking a rest.

<Server Process>

Figure 5:
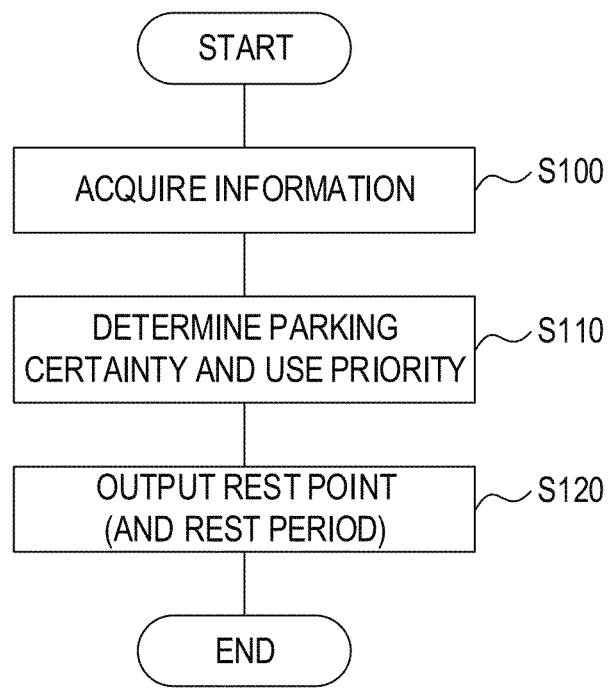
FIG. 5 is a flow diagram schematically showing a process performed by a processor of the server in the operation management system in FIG. 1.

An explanation will be given below as to one example of an adjustment process performed by the processor 23 with reference to the flow diagram in FIG. 5.

In this process, the processor 23 first acquires the traveling plans of the management-target vehicles M including the adjustment-target vehicle, the biological information of the driver of the adjustment-target vehicle, and the crowdedness information of the two or more rest facilities on the traveling route in the traveling plan (step S100).

Next, the processor 23 determines the parking certainty and the use priority for each of the rest facilities based on the acquired information (step S110). Subsequently, the processor 23 outputs, to the communicator 21 and the storage 22, the rest point to be proposed to the driver based on the parking certainty and the use priority (step S120). The outputted rest point is presented to the driver via the terminal unit 10.

1-2. Effects

The above-detailed embodiments produce the following effects.

(1a) Since traveling states of other vehicles and the crowdedness information of the rest facilities are taken into consideration in addition to the driver's state, an available rest facility is proposed to the driver as the rest point. This makes it possible to timely give the driver an opportunity to take a rest.

Moreover, congestion and the necessity of waiting for a parking space to be available can be avoided, and thus, operation of the vehicles according to the traveling plans can be sought. As a result, the operator of the vehicles can seek to save fuel costs.

(1b) Since the sensor 11 includes the camera 11A and the heart rate meter 11B, the determination accuracy of the degree of fatigue and the degree of drowsiness of the driver can be increased without disturbing the driver's driving operation.

2. Other Embodiments

While the embodiments of the present disclosure have been described so far, the present disclosure can take various forms without being limited to the above-described embodiments.

(2a) In the operation management system of the above-described embodiments, the server does not necessarily have to acquire the road information (i.e., the crowdedness information of the rest facilities) from the cloud database. For example, the server itself may have and manage a database.

(2b) The function of a single element in the above-described embodiments may be performed separately by two or more elements, and the function performed by two or more elements may be performed inclusively by a single element. Part of the configuration in the above-described embodiments may be omitted. At least part of the configuration in the above-described embodiments may be added to or replace another configuration in the above-described embodiments. Any and all modes encompassed by the technical idea defined by the language of the claims are embodiments of the present disclosure.

What is claimed is:

1. An operation management system comprising:
    a sensor arranged in each of two or more management-target vehicles and configured to acquire biological information of a driver of each of the two or more management-target vehicles; and
    a server configured to manage traveling plans, each including at least a destination and an arrival time, of the two or more management-target vehicles,
    the server including a processor configured to perform an adjustment process for the traveling plans of the two or more management-target vehicles, and
    the processor being configured, in the adjustment process, to propose, to a driver of an adjustment-target vehicle, which is one of the two or more management-target vehicles, a rest point extracted from two or more rest facilities located on a traveling route in a traveling plan, based on the traveling plan of the adjustment-target vehicle, on the traveling plans of the two or more management-target vehicles other than the adjustment-target vehicle, on biological information of the driver of the adjustment-target vehicle acquired by the sensor, and on crowdedness information of the two or more rest facilities,
    wherein the processor is further configured to prioritize the biological information of the driver of the adjustment-target vehicle acquired by the sensor over the degree of crowdedness information of the two or more rest facilities in the adjustment process.

2. The operation management system according to claim 1,
    wherein the two or more rest facilities are rest facilities provided along an expressway.

3. The operation management system according to claim 1,
    wherein the processor is configured to propose the rest point based on a degree of fatigue and a degree of drowsiness of the driver estimated from the biological information.

4. The operation management system according to claim 3,
    wherein the sensor includes:
        a camera configured to shoot facial expression of the driver; and
        a heart rate meter installed in a seat on which the driver is seated.

5. The operation management system according to claim 3,
    wherein the processor is configured (i) to propose, in addition to the rest point, a rest period and (ii) to adjust a length of the rest period based on the degree of fatigue and the degree of drowsiness of the driver estimated from the biological information.

6. The operation management system according to claim 5,
    wherein the processor is configured to set the proposed rest period to be longer as the degree of fatigue of the driver is higher.

* * * * *